(12) United States Patent
Zheng

(10) Patent No.: US 12,147,276 B2
(45) Date of Patent: Nov. 19, 2024

(54) ROTARY SHAFT KIT AND ELECTRONIC DEVICE

(71) Applicant: GUANGDONG OPPO MOBILE TELECOMMUNICATIONS CORP., LTD., Guangdong (CN)

(72) Inventor: Zekuan Zheng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 188 days.

(21) Appl. No.: 17/976,637

(22) Filed: Oct. 28, 2022

(65) Prior Publication Data

US 2023/0049603 A1 Feb. 16, 2023

Related U.S. Application Data

(63) Continuation of application No. PCT/CN2021/078683, filed on Mar. 2, 2021.

(30) Foreign Application Priority Data

Apr. 30, 2020 (CN) .......................... 202010371340.0

(51) Int. Cl.
*G06F 1/16* (2006.01)
(52) U.S. Cl.
CPC .......... *G06F 1/1681* (2013.01); *G06F 1/1652* (2013.01)
(58) Field of Classification Search
CPC .... G06F 1/1681; G06F 1/1652; G06F 1/1616; E05D 7/04; H04M 1/0216; H04M 1/0268; G09F 9/301
See application file for complete search history.

(56) References Cited

U.S. PATENT DOCUMENTS 9,348,450 B1 * 5/2016 Kim .................... H04M 1/0268
10,550,880 B2 * 2/2020 Hsu ...................... E05D 11/082
(Continued)

FOREIGN PATENT DOCUMENTS

| CN | 108076171 A | 5/2018 |
| CN | 109488681 A | 3/2019 |

(Continued)

OTHER PUBLICATIONS

Chinese First Office Action with English Translation for CN Application 202010371340.0 mailed Mar. 2, 2022 (18 pages).
(Continued)

*Primary Examiner* — Sagar Shrestha
(74) *Attorney, Agent, or Firm* — Young Basile Hanlon & MacFarlane, P.C.

(57) ABSTRACT

Described are a rotary shaft kit and an electronic device. The rotary shaft kit includes: a rotatory shaft assembly, including a protective shell and a first bracket; two rotating assemblies and two housing assemblies. One of the two rotating assemblies is arranged on a side of the rotatory shaft assembly, and the other is arranged on another side; each rotating assembly includes a rotating plate, a first rotating member, and a second rotating member; the first rotating member is connected to the rotating plate at an end of the rotating plate, and the second rotating member is connected to the rotating plate at another end of the rotating plate. One of the two housing assemblies is arranged on the side of the rotatory shaft assembly, and the other is arranged on the another side; each housing assembly includes a second bracket and a fixing plate connected to the second bracket.

19 Claims, 11 Drawing Sheets

(56) References Cited

U.S. PATENT DOCUMENTS

| | | | |
|---|---|---|---|
| 10,551,880 B1 | 2/2020 | Ai et al. | |
| 11,856,721 B2* | 12/2023 | Cheng | H04M 1/0268 |
| 2014/0111954 A1* | 4/2014 | Lee | H04M 1/0268 |
| | | | 361/749 |
| 2016/0085265 A1* | 3/2016 | Park | H04M 1/0268 |
| | | | 361/807 |
| 2020/0103935 A1* | 4/2020 | Hsu | G06F 1/1681 |
| 2020/0371553 A1* | 11/2020 | Hsu | G06F 1/1624 |
| 2021/0173449 A1* | 6/2021 | Yao | G06F 1/1616 |
| 2021/0318723 A1* | 10/2021 | Cheng | G06F 1/1618 |
| 2021/0373609 A1* | 12/2021 | Kim | G06F 1/1681 |
| 2023/0026358 A1* | 1/2023 | Son | G06F 1/1681 |
| 2023/0217616 A1* | 7/2023 | Park | G06F 1/1679 |
| | | | 361/807 |

FOREIGN PATENT DOCUMENTS

| | | | |
|---|---|---|---|
| CN | 208656822 U | 3/2019 | |
| CN | 109780403 A | 5/2019 | |
| CN | 110030255 A | 7/2019 | |
| CN | 110273915 A | 9/2019 | |
| CN | 209390110 U | 9/2019 | |
| CN | 209514482 U | 10/2019 | |
| CN | 110714977 A | 1/2020 | |
| CN | 110784570 A | 2/2020 | |
| CN | 110995892 A | 4/2020 | |
| CN | 210377243 U | 4/2020 | |
| EP | 3489795 A1 | 5/2019 | |
| JP | 2002168231 A | 6/2002 | |
| KR | 1020190065641 A | 8/2022 | |
| TW | M550964 U | 10/2017 | |

OTHER PUBLICATIONS

International search report and Written Opinion with English Translation of the International Search Authority Application No. PCT/CN2021/078683 mailed Apr. 29, 2021 (9 pages).

Extended European Search Report for EP Application 21795503.8 mailed Sep. 28, 2023. (9 pages).

Chinese First Office Action with English Translation for CN Application 202210844701.8 mailed Sep. 15, 2023. (15 pages).

* cited by examiner

ROTARY SHAFT KIT AND ELECTRONIC DEVICE

CROSS-REFERENCE TO RELATED APPLICATION(S)

The present application is a continuation-application of International (PCT) Patent Application No. PCT/CN2021/078683, filed on Mar. 2, 2021, which claims priority of Chinese Patent Application No. 202010371340.0, filed on Apr. 30, 2020, the entire contents of which are hereby incorporated by reference in their entirety.

TECHNICAL FIELD

The present disclosure relates to the field of electronic product technologies, and in particular to a rotary shaft kit and an electronic device.

BACKGROUND

With the continuous development of electronic products, the electronic products are now very popular among the majority of users due to their portability and a rich variety of operation. While at the same time, the expectations and requirements of users for the electronic products are also getting higher. For example, in a conventional flexible electronic device, a rotary shaft kit is an important structural part to control the rotation of the electronic device. However, the structure of the conventional rotary shaft kit is complex, resulting in an increase in an accumulated gap. In this way, the rotary shaft kit is prone to falling and scurrying, thereby reducing the quality and precision of the rotary shaft kit.

SUMMARY

Based on above, a first aspect of the present disclosure provides a rotatory shaft kit, including: a rotatory shaft assembly, including a protective shell and a first bracket arranged on the protective shell; wherein a first accommodating space is defined in the first bracket; two rotating assemblies; wherein one of the two rotating assemblies is arranged on a side of the rotatory shaft assembly, and the other of the two rotating assemblies is arranged on another side of the rotatory shaft assembly opposite to the side; each rotating assembly includes a rotating plate, a first rotating member, and a second rotating member; the first rotating member is connected to the rotating plate at an end of the rotating plate, and the second rotating member is connected to the rotating plate at another end of the rotating plate opposite to the end; the first rotating member is at least partially disposed in the first accommodating space and is rotatable relative to the first bracket; and two housing assemblies; one of the two housing assemblies is arranged on the side of the rotatory shaft assembly, and the other of the two housing assemblies is arranged on the another side of the rotatory shaft assembly; each housing assembly includes a second bracket and a fixing plate connected to the second bracket; a second accommodating space is defined in the second bracket; the second rotating member is at least partially disposed in the second accommodating space and is rotatable relative to the second bracket.

A second aspect of the present disclosure provides an electronic device, including a housing, a flexible screen, and the rotatory shaft kit as above; wherein the flexible screen is arranged on the housing; the housing includes a first sub-housing and a second sub-housing disposed oppositely.; the first sub-housing is connected to one of the housing assemblies arranged on the side of the rotatory shaft kit, and the second sub-housing is connected to the other of the two housing assemblies arranged on the another side of the rotatory shaft kit.

BRIEF DESCRIPTION OF DRAWINGS

In order to more clearly illustrate the technical solutions in the embodiments of the present disclosure, a brief description of the accompanying drawings to be used in the description of the embodiments will be given below.

REFERENCE NUMERALS DESCRIPTION

Figure 1:
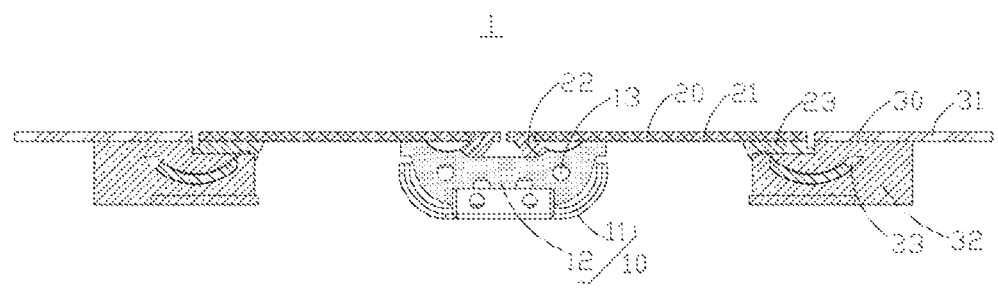
FIG. 1 is a schematic cross-sectional view of a rotatory shaft kit according to an embodiment of the present disclosure.

Rotatory shaft kit—1, first synchronization mechanism—2, electronic device—3, housing—4, first sub-housing—401, second sub-housing—402, flexible screen—5, avoiding groove—6, rotatory shaft assembly—10, protective shell—11, first bracket—12, first accommodating space—13, first rotating part—14, rotating member—15, rotating assembly—20, rotating plate—21, first rotating member—22, first rotating member (A)—221, first rotating member (B)—222, second rotating member—23, second rotating part—24, through hole—25, housing assembly—30, fixing plate—31, second bracket—32, second accommodating space—33, first mounting hole—41, second mounting hole—42, third mounting hole—43, fourth mounting hole—44, first sub-bracket—50, first sub-accommodating space—51, first through hole—52, first positioning part—53, first sub-positioning part—531, second sub-positioning part—532, second sub-bracket—60, second sub-accommodating space—61, second positioning part—62, third sub-positioning part—621, fourth sub-positioning part—622, first internal gear—70, first receiving space—71, second internal gear—72, second receiving space—73, first spur gear—80, first sub-spur gear—81, second sub-spur gear—82, second spur gear—83, third sub-spur gear—84, fourth sub-spur gear—85, compensation assembly—90, first end—901, second end—902, compensation plate—91, first sliding part—92, second sliding part—93, third rotating part—94, fourth rotating part—95, first gear—96, gear set—97, groove—98.

DETAILED DESCRIPTION

The following are some embodiments of the present disclosure. It should be noted that for those skilled in the art, several improvements and modifications may be made without departing from the principle of the present disclosure, and these improvements and modifications are also considered to be within the scope of the present disclosure.

The present disclosure provides a rotatory shaft kit, including: a rotatory shaft assembly, including a protective shell and a first bracket arranged on the protective shell; wherein a first accommodating space is defined in the first bracket; two rotating assemblies; wherein one of the two rotating assemblies is arranged on a side of the rotatory shaft assembly, and the other of the two rotating assemblies is arranged on another side of the rotatory shaft assembly opposite to the side; each rotating assembly includes a rotating plate, a first rotating member, and a second rotating member; the first rotating member is connected to the rotating plate at an end of the rotating plate, and the second rotating member is connected to the rotating plate at another end of the rotating plate opposite to the end; the first rotating member is at least partially disposed in the first accommodating space and is rotatable relative to the first bracket; and two housing assemblies; one of the two housing assemblies is arranged on the side of the rotatory shaft assembly, and the other of the two housing assemblies is arranged on the another side of the rotatory shaft assembly; each housing assembly includes a second bracket and a fixing plate connected to the second bracket; a second accommodating space is defined in the second bracket; the second rotating member is at least partially disposed in the second accommodating space and is rotatable relative to the second bracket.

In some embodiments, a rotation direction of the second rotating member is consistent with a rotation direction of the first rotating member.

In some embodiments, a first rotating part is arranged on the first bracket, a second rotating part is arranged on the first rotating member, and the first rotating part is matched with the second rotating part, such that the first rotating member is rotatable relative to the first bracket.

In some embodiments, a third rotating part is arranged on the second bracket, a fourth rotating part is arranged on the second rotating member, and the third rotating part is matched with the fourth rotating part such that the second rotating member is rotatable relative to the second bracket.

In some embodiments, the rotatory shaft kit further includes a rotating member disposed in the first accommodating space and connected to the first bracket, and the first rotating member is sleeved with the rotating member such that the first rotating member is rotatable relative to the first bracket.

In some embodiments, the rotatory shaft kit further includes another rotating member disposed in the second accommodating space and connected to the second bracket, and the second rotating member is sleeved with the another rotating member such that the second rotating member is rotatable relative to the second bracket.

In some embodiments, the two first rotating members arranged on the opposite sides of the rotatory shaft assembly are a first rotating member (A) and a first rotating member (B) respectively; the rotatory shaft kit further includes a first synchronization mechanism connected to the first rotating member (A) and the first rotating member (B), and the first synchronization mechanism is configured to realize a synchronous rotation of the first rotating member (A) with the first rotating member (B).

In some embodiments, the first synchronization mechanism includes: the first bracket, including a first sub-bracket and a second sub-bracket that are connected; wherein the first sub-bracket defines a first sub-accommodating space, and the second sub-bracket defines a second sub-accommodating space; a first internal gear and a second internal gear; wherein the first internal gear is arranged in the first rotating member (A), and the first internal gear is disposed in the first sub-accommodating space and is rotatable relative to the first sub-bracket; the second internal gear is arranged in the first rotating member (B), and the second internal gear is disposed in the second sub-accommodating space and is rotatable relative to the second sub-bracket; the first internal gear defines a first receiving space, and the second internal gear defines a second receiving space; and a first spur gear and a second spur gear; wherein the first spur gear includes a first sub-spur gear disposed in the first receiving space and a second sub-spur gear disposed outside the first receiving space; the first sub-spur gear is rotatably connected to the first internal gear; the second spur gear includes a third sub-spur gear disposed in the second receiving space and a fourth sub-spur gear disposed outside the second receiving space; the third sub-spur gear is rotatably connected to the second internal gear, and the fourth sub-spur gear is rotatably connected to the second sub-spur gear; in response to the first rotating member (A) rotating, the first internal gear, the second internal gear, the first spur gear, and the second spur gear are matched with each other to cause the first rotating member (A) and the first rotating member (B) to rotate synchronously.

In some embodiments, a rotation direction of the first internal gear is consistent with an arrangement direction of teeth of the first internal gear; a rotation direction of the second internal gear is consistent with an arrangement direction of teeth of the second internal gear.

In some embodiments, a diameter of the second sub-spur gear is greater than a diameter of the first sub-spur gear; a diameter of the fourth sub-spur gear is greater than a diameter of the third sub-spur gear.

In some embodiments, the first sub-bracket defines a first through hole, and the first spur gear penetrates the first through hole.

In some embodiments, the first sub-bracket is arranged with a first positioning part, the second sub-bracket is arranged with a second positioning part, and the first positioning part and the second positioning part are matched with each other to connect the first sub-bracket to the second sub-bracket.

In some embodiments, the rotatory shaft kit further includes two compensation assemblies; wherein one of the two compensation assemblies is on the side of the rotatory shaft assembly, and the other of the two compensation assemblies is arranged on the another side of the rotatory shaft assembly; an end of each compensation assembly is rotatably connected to the first bracket, and there is a spacing between a rotation center of each compensation assembly and a rotation center of a corresponding first rotating member; the other end of each compensation assembly is connected to a corresponding housing assembly, and the corresponding housing assembly is slidable relative to the each compensation assembly such that a distance between the fixing plate and the compensation assembly is adjustable; each compensation assembly includes a compensation plate, and the compensation plate includes a first end and a second end that are opposed to each other.

In some embodiments, the first end is arranged with a third rotating part, and a fourth rotating part is arranged on the first bracket; the third rotating part is matched with the fourth rotating part such that the compensation plate is rotatable relative to the first bracket.

In some embodiments, the second end is arranged with a first sliding part, the second bracket is arranged a second sliding part, and the first sliding part and the second sliding part are matched such that a distance between the compensation plate and the fixing plate is adjustable.

In some embodiments, the rotatory shaft kit further includes a second synchronization mechanism; wherein the second synchronization mechanism includes two first gears each arranged on the third rotating part or the fourth rotating part, and a gear set arranged on the first bracket and rotatably connected to the two first gears; in response to each compensation assembly rotating, a corresponding first gear and the gear set are matched with each other, such that the two compensation assemblies rotate synchronously.

In some embodiments, the two first gears and the gear set are arranged in a groove defined on the first bracket.

The present disclosure further provides an electronic device, including a housing, a flexible screen, and the rotatory shaft kit as above; wherein the flexible screen is arranged on the housing; the housing includes a first sub-housing and a second sub-housing disposed oppositely.; the first sub-housing is connected to one of the housing assemblies arranged on the side of the rotatory shaft kit, and the second sub-housing is connected to the other of the two housing assemblies arranged on the another side of the rotatory shaft kit.

In some embodiments, the flexible screen is arranged on the rotatory shaft kit such that the flexible screen is inwardly foldable.

In some embodiments, a side of the first bracket close to the flexible screen defines an avoiding groove, and the avoiding groove is configured to receive a part of the flexible screen in response to the electronic device being bent.

Before introducing the technical solution of the present disclosure, technical problems in the related art will be introduced in detail.

In a flexible electronic device, a rotatory shaft kit is an important structural component that control the rotation of the flexible electronic device. There are various types of the rotatory shaft kits, which are usually named by the number of plates included in the rotatory shaft kit to support the flexible screen, such as four-plate rotatory shaft kit, five-plate rotatory shaft kit, etc. When the number of plates is large, such as for a five-plate rotatory shaft kit, there will be a gap between each two adjacent plates. That is, the five-plate rotatory shaft kit will have one more gap (a break difference) relative to a four-plate rotatory shaft kit. In this way, a surface effect of the flexible screen may be affected due to the fact that the flexible screen at a position facing the gap is subjected to no rigid support and the gap will affect the flushness between two adjacent plates resulting in a height difference between the flexible screens at different places. As for a four-plate rotatory shaft kit, the four-plate rotatory shaft kit in the related art has a complex structure with more parts, and there will be assembly tolerances between each two parts, which may lead to an increase in the accumulated gaps in the rotatory shaft kit, thereby increasing the size of the resulting size chain, increasing the amount of falling and scurrying, and reducing the quality of the rotatory shaft kit.

In view of this, the present disclosure provides a rotatory shaft kit. A four-plate rotatory shaft kit is formed by a rotating plate and a fixing plate arranged on opposite sides. In addition, a first rotating member is matched with a first bracket, and a second rotating member is matched with a second bracket to realize a simple structure of the rotatory shaft kit.

Figure 2:
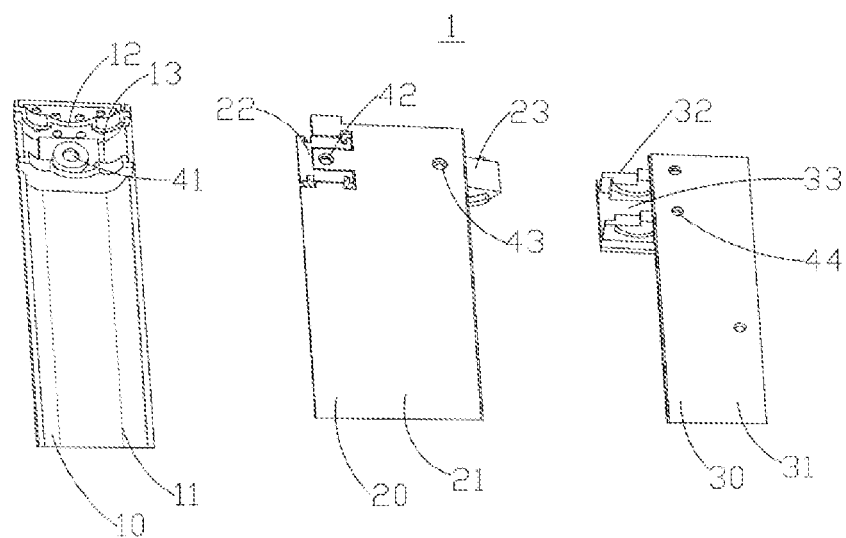
FIG. 2 is a perspective schematic view of a partial structure of a rotatory shaft kit according to an embodiment of the present disclosure.

Referring to FIG. 1 to FIG. 2, FIG. 1 is a schematic cross-sectional view of a rotatory shaft kit according to an embodiment of the present disclosure, and FIG. 2 is a perspective schematic view of a partial structure of a rotatory shaft kit according to an embodiment of the present disclosure. Provided is a rotatory shaft kit 1, the rotatory shaft kit 1 including a rotatory shaft assembly 10, two rotating assemblies 20, and two housing assemblies 30. The rotatory shaft assembly 10 includes a protective shell 11, and a first bracket 12 arranged on the protective shell 11. A first accommodating space 13 is defined in the first bracket 12. One of the two rotating assemblies 20 is arranged on a side of the rotatory shaft assembly 10, and the other of the two rotating assemblies 20 is arranged on another side of the rotatory shaft assembly 10 opposite to the side. Each rotating assembly 20 includes a rotating plate 21, a first rotating member 22, and a second rotating member 23; the first rotating member 22 is connected to the rotating plate 21 at an end of the rotating plate 21, and the second rotating member 23 is connected to the rotating plate 21 at another end of the rotating plate 21 opposite to the end. The first rotating member 22 is at least partially disposed in the first accommodating space 13 and is capable of rotating relative to the first bracket 12. One of the two housing assemblies 30 is arranged on the side of the rotatory shaft assembly 10, and the other of the two housing assemblies 30 is arranged on the another side of the rotatory shaft assembly 10. Each housing assembly 30 includes a second bracket 32 and a fixing plate 31 connected to the second bracket 32. A second accommodating space 33 is defined in the second bracket 32. The second rotating member 23 is at least partially disposed in the second accommodating space 33 and is capable of rotating relative to the second bracket 32.

The rotatory shaft assembly 10 provided in the present disclosure includes the protective shell 11. The protective shell 11 is configured to carry the first bracket 12 and fix the first bracket 12 on the protective shell 11, and further configured to cover the first bracket 12, such that the first bracket 12 is not exposed, thereby preventing damage to the first bracket 12.

The present disclosure further includes the rotating assemblies 20 arranged on opposite sides of the rotatory shaft assembly 10. FIG. 2 only shows the structure of the rotating assembly 20 on one side. The structure of the rotating assembly 20 on the other side is similar to the rotating assembly 20 provided in the embodiments and is symmetrically arranged with respect to the rotatory shaft assembly 10. Each rotating assembly 20 includes the rotating plate 21, and the rotating plates 21 on the opposite sides are two plates in the four-plate rotatory shaft kit 1. The rotating plate 21 may be configured to carry a flexible screen 5 and provide rigid support for the flexible screen 5, and the rotating plate 21 may be further configured to connect the first rotating member 22 and the second rotating member 23, such that the first rotating member 22 and the second rotating member 23 may be carried on the rotating plate 21. In addition, the first rotating member 22 may be at least partially disposed in the first accommodating space 13, such that the first rotating member 22 can rotate relative to the first bracket 12. In this way, through the matching of the first rotating member 22 and the first bracket 12, the rotating assembly 20 can rotate relative to the rotatory shaft assembly 10.

The present disclosure further includes the housing assemblies 30 arranged on opposite sides of the rotatory shaft assembly 10. FIG. 2 only shows the structure of the housing assembly 30 on one side. The structure of the housing assembly 30 on the other side is similar to the housing assembly 30 provided in the embodiments and is symmetrically arranged with respect to the rotatory shaft assembly 10. Each housing assembly 30 includes the fixing plate 31, and the fixing plates 31 on the opposite sides are the other two plates in the four-plate rotatory shaft kit 1. The fixing plate 31 may be configured to carry the flexible screen 5 and provide rigid support for the flexible screen 5, and the fixing plate 31 may be further configured to subsequently connect a housing 4. When the fixing plate 31 rotates, the housing 4 can be driven to rotate together. In addition, the fixing plate 31 may be further configured to fix and connect the second bracket 32, such that the second bracket 32 may be carried on the fixing plate 31. In the present disclosure, the second rotating member 23 may be at least partially disposed in the second accommodating space 33, and the second rotating member 23 can also rotate relative to the second bracket 32. In this way, through the matching of the second rotating member 23 and the second bracket 32, the housing assembly 30 can rotate relative to the rotating assembly 20, and the housing 4 connected to the housing assembly 30 can also rotate.

In summary, the rotatory shaft kit 1 provided by the present disclosure forms a four-plate shaft assembly structure through the two rotating plates 21 and two fixing plates 31 on opposite sides of the rotatory shaft assembly 10. The matching of the first rotating member 22 and the first bracket 12 enables the rotating assembly 20 to rotate relative to the rotatory shaft assembly 10, and the matching of the second rotating member 23 and the second bracket 32 enables the housing assembly 30 to rotate relative to the rotating assembly 20, such that the rotatory shaft kit 1 as a whole can rotate at multiple angles. The rotatory shaft kit 1 provided by the present disclosure has a simple structure, and only a few components are needed to realize the rotation of the rotatory shaft kit 1, thereby reducing the accumulated gaps between various components, reducing the size of the resulting size chain, and reducing the amount of falling and scurrying, and improving the quality of the rotatory shaft kit 1.

In some embodiments, a rotation direction of the second rotating member 23 is consistent with a rotation direction of the first rotating member 22, thereby increasing the rotation angle of the rotatory shaft kit 1, such that the rotatory shaft kit 1 can rotate in a wider angle range.

In some embodiments, referring to FIG. 1 again, the first bracket 12, the first rotating member 22, the second rotating member 23, and the second bracket 32 may be fixed by defining mounting holes on the protective shell 11, the rotating plate 21, and the fixing plate 31 and by fixing members such as screws. For example, a first mounting hole 41 may be defined on the protective shell 11 to fix the first bracket 12 on the protective shell 11. A second mounting hole 42 may be defined at the end of the rotating plate 21 to fix the first rotating member 22 on the rotating plate 21. A third mounting hole 43 may be defined at the another end of the rotating plate 21 to fix the second rotating member 23 on the rotating plate 21. A fourth mounting hole 44 may be defined on the fixing plate 31 to fix the second bracket 32 on the fixing plate 31.

Figure 3:
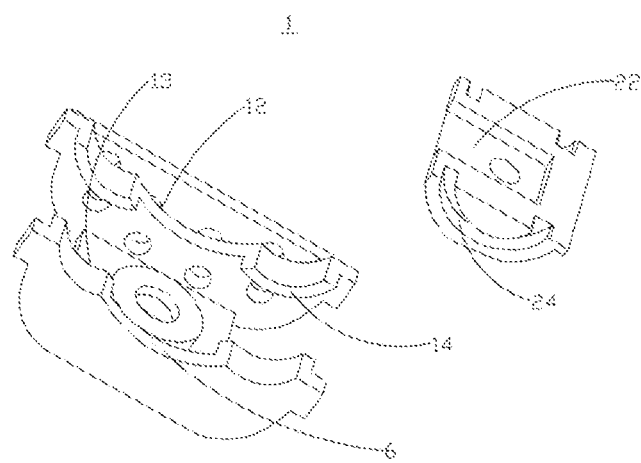
FIG. 3 is a structural schematic view of a first bracket and a first rotating member according to an embodiment of the present disclosure.

Referring to FIG. 3, FIG. 3 is a structural schematic view of a first bracket and a first rotating member according to an embodiment of the present disclosure. In the embodiments, a first rotating part 14 is arranged on the first bracket 12, a second rotating part 24 is arranged on the first rotating member 22, and the first rotating part 14 is matched with the second rotating part 24 such that the first rotating member 22 can rotate relative to the first bracket 12.

As mentioned above, the first rotating member 22 can rotate relative to the first bracket 12, and the present disclosure provides two implementations therefor. In an implementation, the first rotating part 14 may be arranged on the first bracket 12, and the second rotating part 24 may be arranged on the first rotating member 22, and the first rotating part 14 is matched with the second rotating part 24 such that the first rotating member 22 can rotate relative to the first bracket 12. In some embodiments, the first rotating part 14 may be a sliding groove or a guide rail, and the second rotating part 24 may be a guide rail or a sliding groove correspondingly. Specifically, when the first rotating part 14 is a guide rail, the second rotating part 24 may be a sliding groove. When the first rotating part 14 is a sliding groove, the second rotating part 24 may be a guide rail. In the embodiments, the first rotating part 14 as a guide rail and the second rotating part 24 as a sliding groove is taken as an example.

Figure 4:
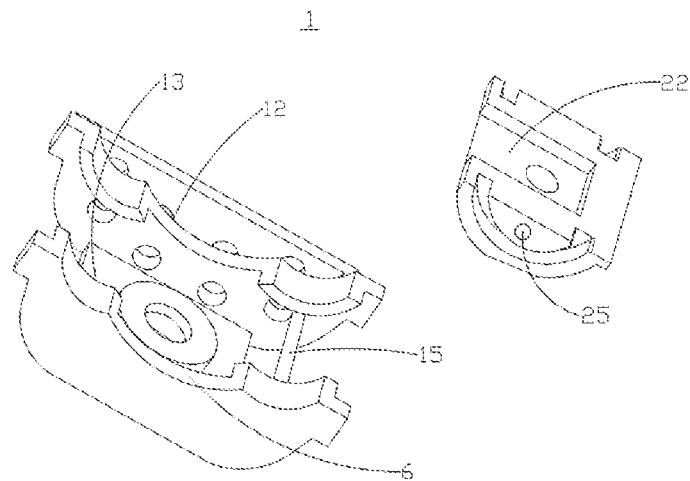
FIG. 4 is a structural schematic view of a first bracket and a first rotating member according to another embodiment of the present disclosure.

Further referring to FIG. 4, FIG. 4 is a structural schematic view of a first bracket and a first rotating member according to another embodiment of the present disclosure. In this implementation, the rotatory shaft kit 1 further includes a rotating member 15 disposed in the first accommodating space 13 and connected to the first bracket 12, and the first rotating member 22 is sleeved with the rotating member 15 such that the first rotating member 22 can rotate relative to the first bracket 12.

In an implementation, the first rotating member 22 can rotate relative to the first bracket 12 through the matching of the first rotating part 14 and the second rotating part 24. In another implementation, the rotating member 15 may be further arranged on the first bracket 12, and a through hole 25 may be defined on the first rotating member 22. The first rotating member 22 is required to be sleeved around the rotating member 15 by the through hole 25 such that the first rotating member 22 can rotate around the rotating member 15, and the first rotating member 22 can thus rotate relative to the first bracket 12. In addition, the rotating member 15 may further help to mount the first rotating member 22 on the first bracket 12.

Figure 5:
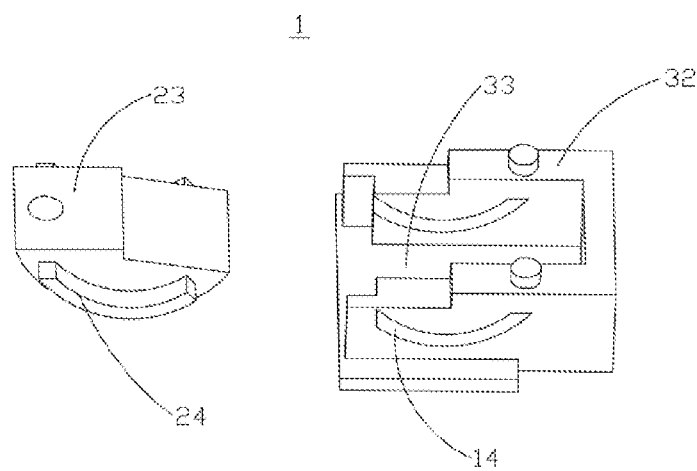
FIG. 5 is a structural schematic view of a second bracket and a second rotating member according to an embodiment of the present disclosure.
Figure 6:
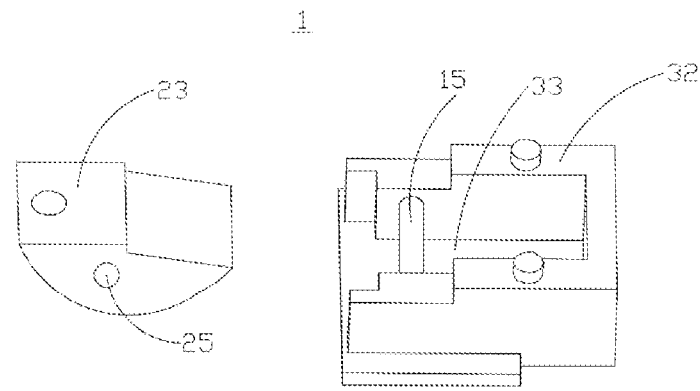
FIG. 6 is a structural schematic view of a second bracket and a second rotating member according to another embodiment of the present disclosure.

Referring to FIGS. 5 to 6 together, FIG. 5 is a structural schematic view of a second bracket and a second rotating member according to an embodiment of the present disclosure, and FIG. 6 is a structural schematic view of a second bracket and a second rotating member according to another embodiment of the present disclosure. The above introduces two implementations in which the first rotating member 22 can rotate relative to the first bracket 12. The second rotating member 23 and the second bracket 32 may also have the same structure, such that the second rotating member 23 can rotate relative to the second bracket 32. In an implementation, a first rotating part 14 is arranged on the second bracket 32, a second rotating part 24 is arranged on the second rotating member 23, and the first rotating part 14 is matched with the second rotating part 24 such that the second rotating member 23 can rotate relative to the second bracket 32. In another implementation, the rotatory shaft kit 1 further includes a rotating member 15 disposed in the second accommodating space 33 and connected to the second bracket 32, and the second rotating member 23 is sleeved with the rotating member 15 such that the second rotating member 23 can rotate relative to the second bracket 32.

Figure 7:
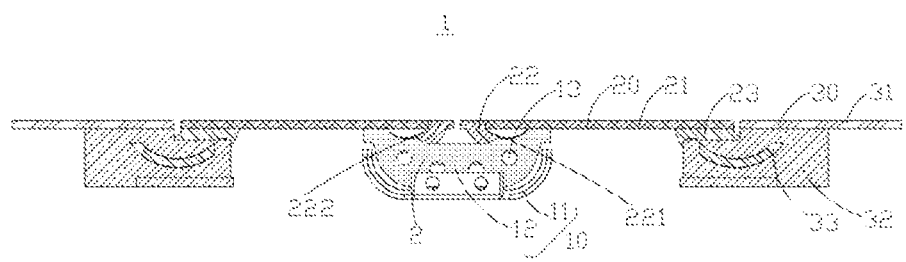
FIG. 7 is a schematic cross-sectional view of a rotatory shaft kit according to another embodiment of the present disclosure.

Further referring to FIG. 7, FIG. 7 is a schematic cross-sectional view of a rotatory shaft kit according to another embodiment of the present disclosure. In this embodiment, the first rotating members 22 arranged on the opposite sides of the rotatory shaft assembly 10 are specifically a first rotating member (A) 221 and a first rotating member (B) 222 respectively. The rotatory shaft kit 1 further includes a first synchronization mechanism 2 connected to the first rotating member (A) 221 and the first rotating member (B) 222, and the first synchronization mechanism 2 is configured to realize a synchronous rotation of the first rotating member (A) 221 with the first rotating member (B) 222.

The first rotating members 22 on the both sides of the rotatory shaft kit 1 may move independently. For example, when the first rotating member (A) 221 in FIG. 7 moves, the rotating assembly 20 and the housing assembly 30 on the right side are driven to rotate together. At this time, the first rotating member (B) 222 on the other side, that is, on the left side, may be in a stationary state, such that the rotating assembly 20 and the housing assembly 30 on the left side may also be in a stationary state. It can be understood that it is possible that the right part of the rotatory shaft kit 1 moves while the left part is still in a horizontal state.

In other embodiments, the present disclosure may further introduce the first synchronization mechanism 2 connected to the first rotating member (A) 221 and the first rotating member (B) 222. In this way, when the first rotating member (A) 221 moves, the first rotating member (B) 222 can also move synchronously through the first synchronization mechanism 2, such that the rotating assembly 20 and the housing assembly 30 on opposite sides can be moved simultaneously, which improves the symmetry effect of the rotatory shaft kit 1.

Figure 8:
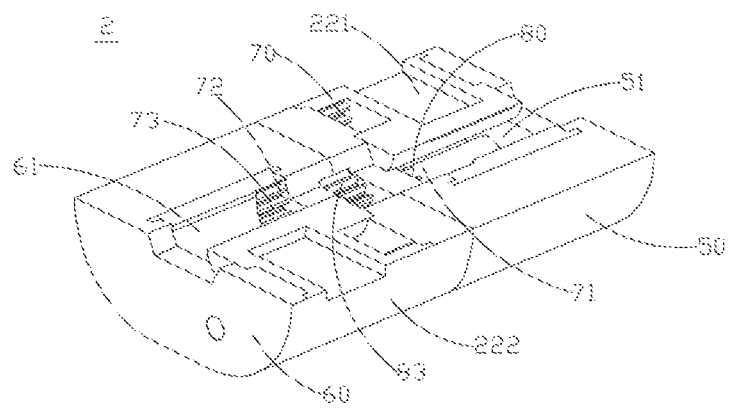
FIG. 8 is a structural schematic view of a first synchronization mechanism according to an embodiment of the present disclosure.
Figure 9:
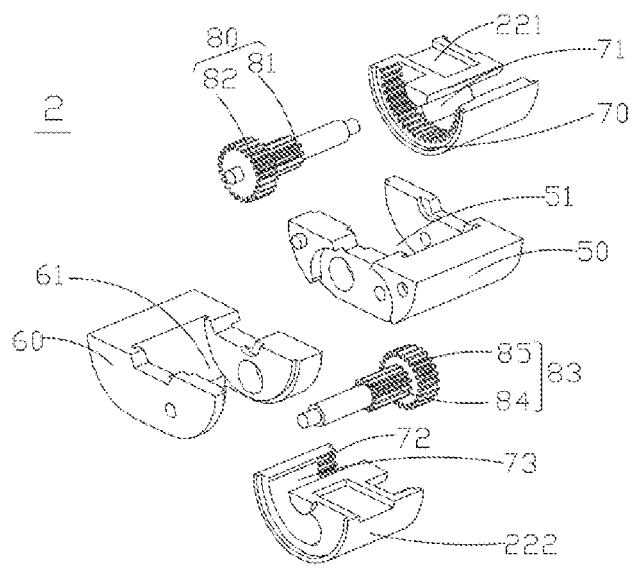
FIG. 9 is an exploded view of FIG. 8.
Figure 10:
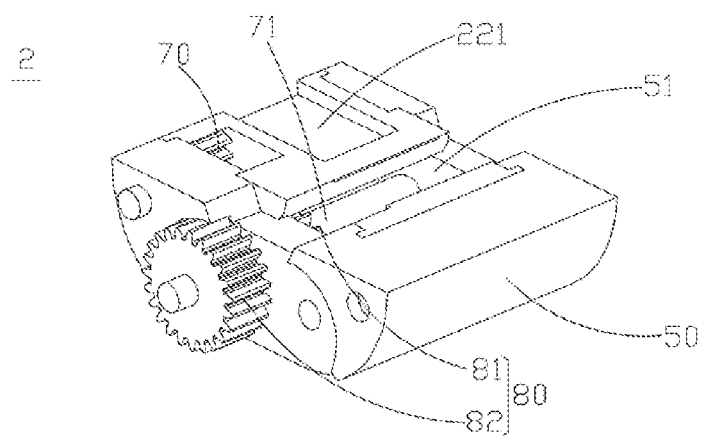
FIG. 10 is a structural schematic view of a first sub-bracket, a first internal gear, and a first spur gear shown in FIG. 8.
Figure 11:
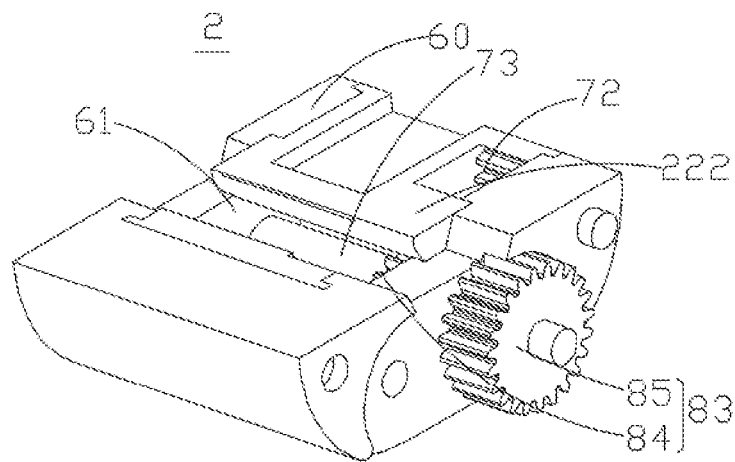
FIG. 11 is a structural schematic view of a second sub-bracket, a second internal gear, and a second spur gear shown in FIG. 8.
Figure 12:
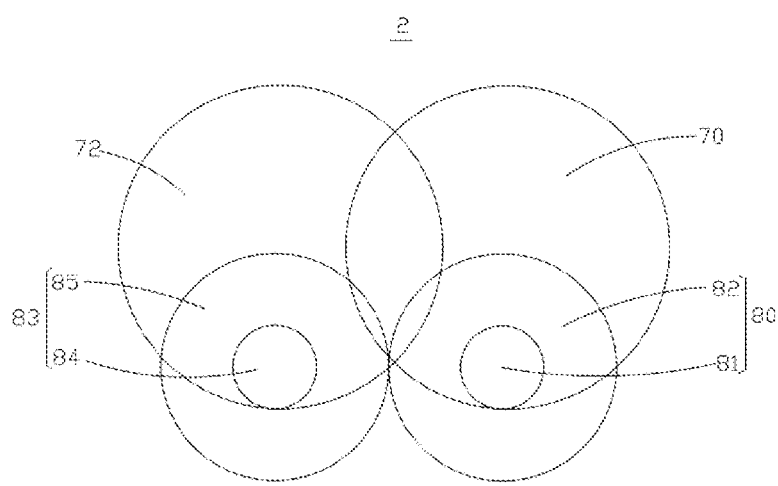
FIG. 12 is a schematic view of a matching of the first sub-bracket, the first internal gear, the first spur gear, and the second spur gear shown in FIG. 8.

Referring to FIGS. 8-12 together, FIG. 8 is a structural schematic view of a first synchronization mechanism according to an embodiment of the present disclosure, FIG. 9 is an exploded view of FIG. 8, FIG. 10 is a structural schematic view of a first sub-bracket, a first internal gear, and a first spur gear shown in FIG. 8, FIG. 11 is a structural schematic view of a second sub-bracket, a second internal gear, and a second spur gear shown in FIG. 8, and FIG. 12 is a schematic view of a matching of the first sub-bracket, the first internal gear, the first spur gear, and the second spur gear shown in FIG. 8. In the embodiments, the first synchronization mechanism 2 includes the first bracket 12, which includes a first sub-bracket 50 and a second sub-bracket 60 that are connected; a first internal gear 70 and a second internal gear 72; and a first spur gear 80 and a second spur gear 83. The first sub-bracket 50 defines a first sub-accommodating space 51, and the second sub-bracket 60 defines a second sub-accommodating space 61. The first internal gear 70 is arranged in the first rotating member (A) 221, and the first internal gear 70 is arranged in the first sub-accommodating space 51 and is capable of rotating relative to the first sub-bracket 50; the second internal gear 72 is arranged in the first rotating member (B) 222, and the second internal gear 72 is arranged in the second sub-accommodating space 61 and is capable of rotating relative to the second sub-bracket 60. The first internal gear 70 defines a first receiving space 71, and the second internal gear 72 defines a second receiving space 73. The first spur gear 80 includes a first sub-spur gear 81 arranged in the first receiving space 71 and a second sub-spur gear 82 arranged outside the first receiving space 71. The first sub-spur gear 81 is rotatably connected to the first internal gear 70. The second spur gear 83 includes a third sub-spur gear 84 arranged in the second receiving space 73 and a fourth sub-spur gear 85 arranged outside the second receiving space 73. The third sub-spur gear 84 is rotatably connected to the second internal gear 72, and the fourth sub-spur gear 85 is rotatably connected to the second sub-spur gear 82. When the first rotating member (A) 221 rotates, the first internal gear 70, the second internal gear 72, the first spur gear 80, and the second spur gear 83 are matched with each other to make the first rotating member (A) 221 and the first rotating member (B) 222 rotate synchronously.

The first sub-bracket 50 provided in the present disclosure is configured to arrange the first internal gear 70 and the first spur gear 80, and the second sub-bracket 60 is configured to arrange the second internal gear 72 and the second spur gear 83. In addition, the first sub-bracket 50 and the second sub-bracket 60 are connected, thereby reducing the difficulty of forming a gear pair and reducing the size of the first synchronization mechanism 2.

The present disclosure further provides the first internal gear 70 and the second internal gear 72. Among them, the internal gear refers to a gear with teeth on the inner circle. In the present disclosure, the first internal gear 70 is integrated in the first rotating member (A) 221, and the first internal gear 70 is arranged in the first sub-accommodating space 51 and can rotate relative to the first sub-bracket 50. In some embodiments, a part of the first rotating member (A) 221 is arranged in the first sub-accommodating space 51. The second internal gear 72 is further integrated into the first rotating member (B) 222, and the second internal gear 72 is arranged in the second sub-accommodating space 61 and can rotate relative to the second sub-bracket 60. In some embodiments, a part of the first rotating member (B) 222 is arranged in the second sub-accommodating space 61. The first sub-accommodating space 51 is configured to arrange the first internal gear 70, and the first internal gear 70 can rotate relative to the first sub-bracket 50. In some embodiments, the rotation direction of the first internal gear 70 is consistent with an arrangement direction of the teeth of the first internal gear 70. The second sub-accommodating space 61 is configured to arrange the second internal gear 72, and the second internal gear 72 can rotate relative to the second sub-bracket 60. In some embodiments, the rotation direction of the second internal gear 72 is consistent with an arrangement direction of the teeth of the second internal gear 72.

The present disclosure further provides the first spur gear 80 and the second spur gear 83. The first spur gear 80 includes the first sub-spur gear 81 arranged in the first receiving space 71 and the second sub-spur gear 82 arranged outside the first receiving space 71. It can be understood that since the teeth of the first internal gear 70 are located on the inner circle, a part of the first spur gear 80 is required to be arranged in the first receiving space 71 and rotatably connected with the first internal gear 70 to form a gear pair, and the remaining part of the first spur gear 80 is arranged outside the first receiving space 71. The second spur gear 83 may also be understood in the same manner. The second spur gear 83 includes the third sub-spur gear 84 arranged in the second receiving space 73 and the third sub-spur gear 84 arranged outside the second receiving space 73. It can be understood that since the teeth of the second internal gear 72 are located on the inner circle, a part of the second spur gear 83 is required to be arranged in the second receiving space 73 and rotatably connected with the second internal gear 72 to form a gear pair, and the remaining part of the second spur gear 83 is arranged outside the second receiving space 73 and is rotatably connected with the remaining part of the first spur gear 80 arranged outside the first receiving space 71. That is, the fourth sub-spur gear 85 is rotatably connected to the second sub-spur gear 82 to form a gear pair.

In summary, the first synchronization mechanism 2 provided by the present disclosure forms three gear pairs by using two internal gears and two spur gears to match with each other. It can also be understood that the first internal gear 70 and the first sub-spur gear 81 constitutes a first gear pair, the second sub-spur gear 82 and the fourth sub-spur gear 85 constitute a second gear pair, and the third sub-spur gear 84 and the second internal gear 72 constitute a third gear pair. When the first internal gear 70 in the first rotating member (A) 221 rotates, the first internal gear 70 rotates synchronously with the first sub-spur gear 81, and the first sub-spur gear 81 rotates synchronously with the second sub-spur gear 82, the second sub-spur gear 82 rotates synchronously with the fourth sub-spur gear 85, the fourth sub-spur gear 85 rotates synchronously with the third sub-spur gear 84, and the third sub-spur gear 84 rotates synchronously with the second internal gear 72. Since the second internal gear 72 is arranged in the first rotating member (B) 222, and it can be therefore realized that the first rotating member (A) 221 rotates synchronously with the second rotating member 23 (B). The first synchronization mechanism 2 provided by the present disclosure has a simple structure. In this way, the synchronous rotation of the first rotating member (A) 221 and the second rotating member 23 (B) may be realized by virtue of the three gear pairs. In addition, the reduction in the number of gear pairs can reduce the accumulated amount of idle travel and improve the synchronization effect of the first synchronization mechanism 2.

Figure 13:
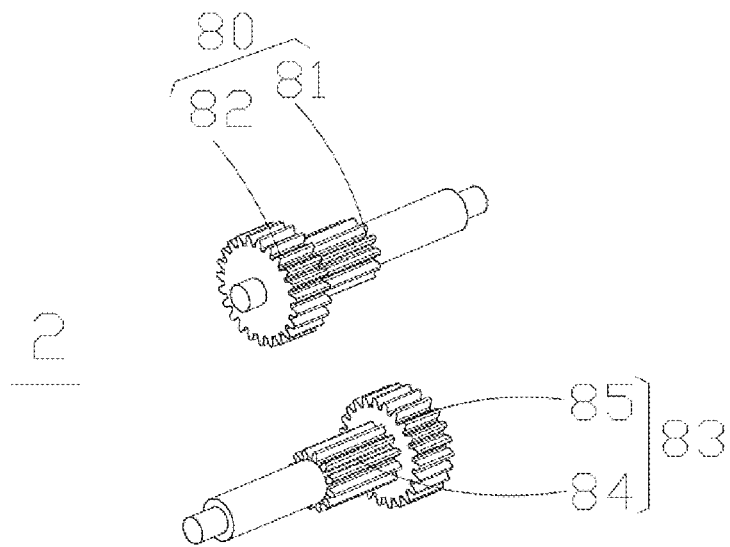
FIG. 13 is a structural schematic view of a first spur gear and a second spur gear according to an embodiment of the present disclosure.

Further referring to FIG. 13, FIG. 13 is a structural schematic view of a first spur gear and a second spur gear according to an embodiment of the present disclosure. In the embodiments, the diameter of the second sub-spur gear 82 is greater than the diameter of the first sub-spur gear 81; the diameter of the fourth sub-spur gear 85 is greater than the diameter of the third sub-spur gear 84.

When the first synchronization mechanism 2 is in motion, that is, when the first internal gear 70 and the second internal gear 72 are rotating synchronously, the distance between the first spur gear 80 and the second spur gear 83 may have a slight deviation. For example, in a case where the first internal gear 70 and the second internal gear 72 rotate 90°, when the diameters of the second sub-spur gear 82 and the first sub-spur gear 81 are the same, and the diameters of the fourth sub-spur gear 85 and the third sub-spur gear 84 are the same, there may be a certain gap between the second sub-spur gear 82 and the fourth sub-spur gear 85, which makes the meshing incomplete. Therefore, in the present disclosure, the diameter of the second sub-spur gear 82 is greater than the diameter of the first sub-spur gear 81, and the diameter of the fourth sub-spur gear 85 is greater than the diameter of the third sub-spur gear 84, such that regardless of the angle of movement of the first internal gear 70 and the second internal gear 72, the second sub-spur gear 82 and the fourth sub-spur gear 85 can be completely meshed, thereby improving the synchronization effect of the first synchronization mechanism 2.

Figure 14:
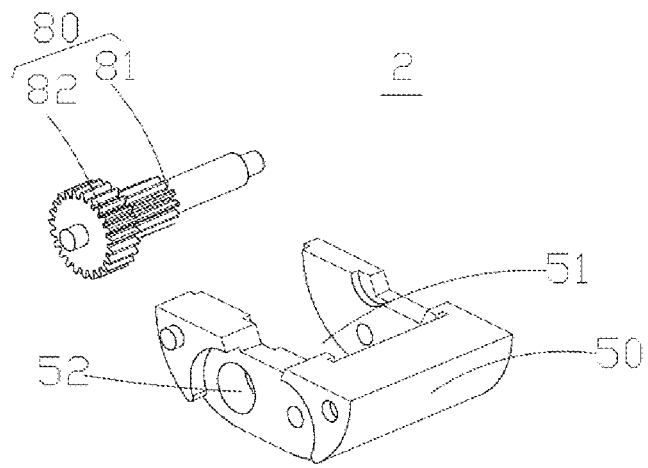
FIG. 14 is a structural schematic view of a first sub-bracket and a first spur gear according to an embodiment of the present disclosure.

Further referring to FIG. 14, FIG. 14 is a structural schematic view of a first sub-bracket and a first spur gear according to an embodiment of the present disclosure. In the embodiments, the first sub-bracket 50 defines a first through hole 52, and the first spur gear 80 penetrates the first through hole 52.

In the present disclosure, the first through hole 52 may be defined on the first sub-bracket 50, and the first spur gear 80 penetrates the first through hole 52 of the first sub-bracket 50, such that the first spur gear 80 is arranged on the first sub-bracket 50, and the first spur gear 80 can rotate relative to the first sub-bracket 50. Moreover, the first through hole 52 may further enable the first sub-spur gear 81 to be rotatably connected with the first internal gear 70 after the first spur gear 80 is arranged. In this way, when the first internal gear 70 moves and rotates, the first sub-spur gear 81 can rotate synchronously, and the second sub-spur gear 82 can rotate synchronously. In some embodiments, the first through holes 52 may be defined on opposite sides of the first sub-bracket 50 to further improve the installation effect of the first spur gear 80.

Figure 15:
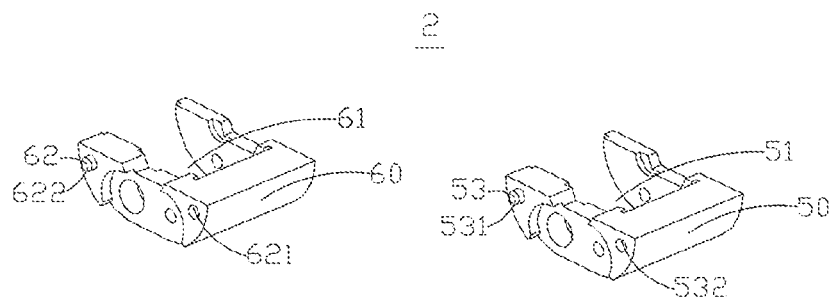
FIG. 15 is a structural schematic view of a first sub-bracket and a second sub-bracket according to an embodiment of the present disclosure.

Further referring to FIG. 15, FIG. 15 is a structural schematic view of a first sub-bracket and a second sub-bracket according to an embodiment of the present disclosure. In the embodiments, the first sub-bracket 50 is arranged with a first positioning part 53, the second sub-bracket 60 is arranged with a second positioning part 62, and the first positioning part 53 and the second positioning part 62 are matched with each other to connect the first sub-bracket 50 to the second sub-bracket 60.

The above mentions that the first sub-bracket 50 may be connected with the second sub-bracket 60 to form the first bracket 12 of the present disclosure. Therefore, in the embodiments, the first positioning part 53 may be arranged on the first sub-bracket 50, the second positioning part 62 may be arranged on the second sub-bracket 60, and the first positioning part 53 and the second positioning part 62 may be disposed opposite to each other. The first positioning part 53 and the second positioning part 62 are matched with each other such that the first sub-bracket 50 is connected to the second sub-bracket 60. In some embodiments, the first positioning part 53 may be a bump or groove 98, and the second positioning part 62 may be a groove 98 or a bump. Further in some embodiments, the first positioning part 53 includes a first sub-positioning part 531 and a second sub-positioning part 532 disposed oppositely, and the second positioning part 62 includes a third sub-positioning part 621 and a fourth sub-positioning part 622 disposed oppositely. As shown in FIG. 15, the first sub-positioning part 531 may be a bump and the second sub-positioning part 532 may be a groove 98, while the third sub-positioning part 621 may be a groove 98 and the fourth sub-positioning part 622 may be a bump, which further improves the connection effect of the first sub-bracket 50 and the second sub-bracket 60. Of course, the present disclosure is only illustrated by the embodiment shown in FIG. 15, and other embodiments can also achieve the beneficial effects of the present disclosure.

Figure 16:
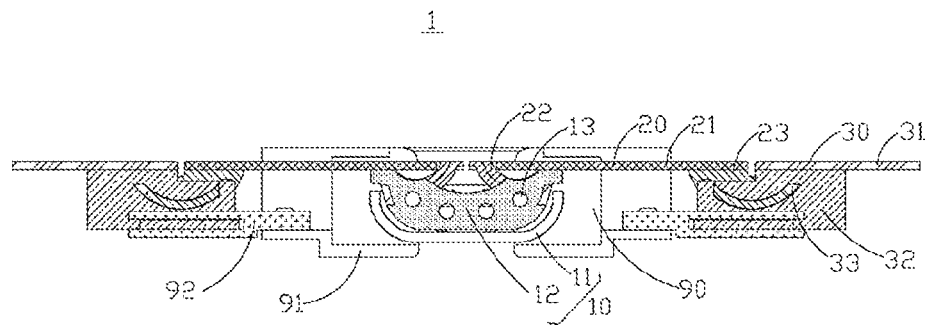
FIG. 16 is a schematic cross-sectional view of a rotatory shaft kit according to further another embodiment of the present disclosure.
Figure 17:
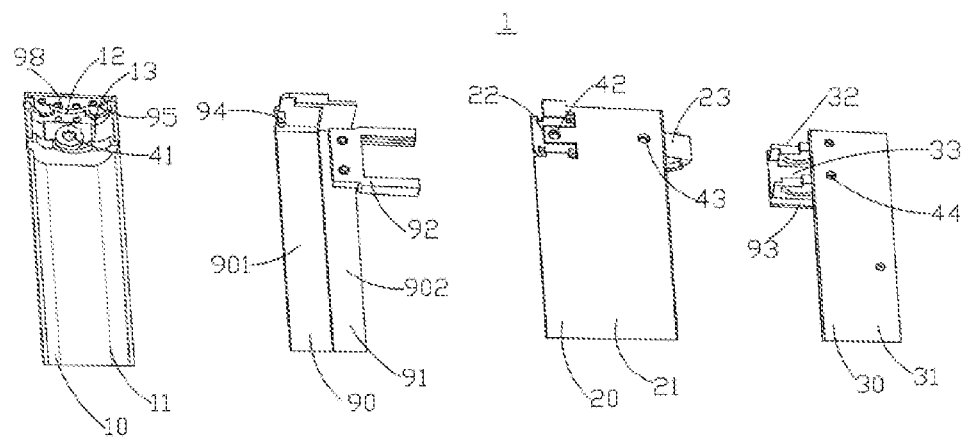
FIG. 17 is a perspective schematic view of a partial structure of the rotatory shaft kit shown in FIG. 16.
Figure 18:
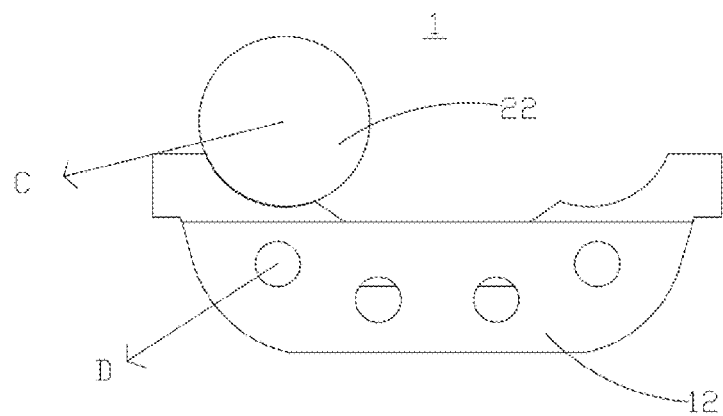
FIG. 18 is a schematic view of a rotation center of a compensation assembly of a first bracket and a rotation center of a first rotating member according to an embodiment of the present disclosure.
Figure 19:
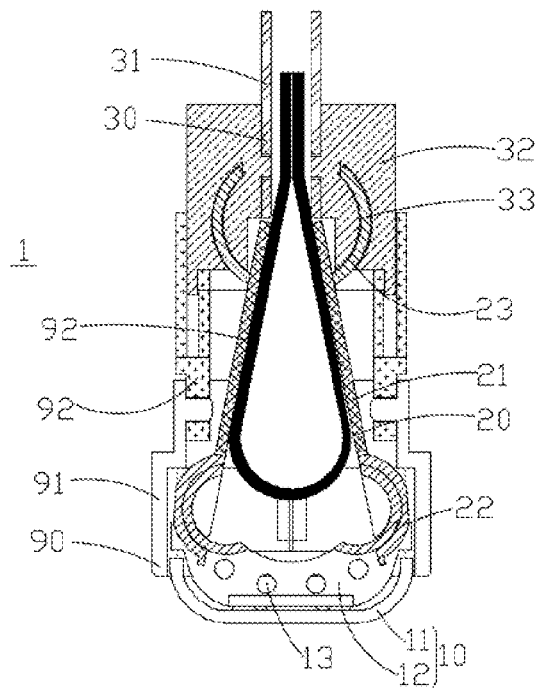
FIG. 19 is a schematic cross-sectional view of a rotatory shaft kit after being bent according to further another embodiment of the present disclosure.

Referring to FIGS. 16-19 together, FIG. 16 is a schematic cross-sectional view of a rotatory shaft kit according to further another embodiment of the present disclosure, FIG. 17 is a perspective schematic view of a partial structure of the rotatory shaft kit shown in FIG. 16, FIG. 18 is a schematic view of a rotation center of a compensation assembly of a first bracket and a rotation center of a first rotating member according to an embodiment of the present disclosure, and FIG. 19 is a schematic cross-sectional view of a rotatory shaft kit after being bent according to further another embodiment of the present disclosure. In the embodiments, the rotatory shaft kit 1 further includes two compensation assemblies 90 arranged on opposite sides of the shaft assembly 10. An end of each compensation assembly 90 is rotatably connected to the first bracket 12, and there is a spacing between a rotation center of the compensation assembly 90 (shown by "D" in FIG. 18) and a rotation center of the first rotating member 22 (shown by "C" in FIG. 18). The other end of each compensation assembly 90 is connected to a corresponding housing assembly 30, and the corresponding housing assembly 30 is capable of sliding relative to the compensation assembly 90 such that a distance between the fixing plate 31 and the compensation assembly 90 can be adjusted.

When the rotatory shaft kit 1 is applied to an electronic device 3, the flexible screen 5 can be bent to form the flexible electronic device 3. When the bending manner of the flexible screen 5 is inward folding, there are generally two bending methods: a U-shaped screen and a drop-shaped screen. The U-shaped screen will make the overall thickness of the electronic device 3 thicker, while the drop-shaped screen may make the electronic device 3 thinner. Therefore, in the present disclosure, the compensation assembly 90 may be further included in the rotatory shaft kit 1, and the compensation assembly 90 can be matched with other components to make the flexible screen 5 form a drop-shaped screen.

Specifically, in the present disclosure, the end of the compensation assembly 90 may be rotatably connected to the first bracket 12, such that the compensation assembly 90 can rotate relative to the first bracket 12. In some embodiments, the rotation direction of the compensation assembly 90 is consistent with the rotation direction of the first rotating member 22; and in order to form a drop-shaped screen, there is a spacing between the rotation center of the compensation assembly 90 (shown by "D" in FIG. 18) and the rotation center of the first rotating member 22 (shown by "C" in FIG. 18). It can also be understood that, as shown in FIG. 18, the rotation center of the compensation assembly 90 does not coincide with the rotation center of the first rotating member 22, such that a crank slider movement occurs when the rotatory shaft kit 1 is rotating, thereby causing the first rotating member 22 to rotate differently from the compensation assembly 90, forming a position distance, and finally forming a drop-shaped screen.

In addition, in the present disclosure, the other end of the compensation assembly 90 may be connected to the corresponding housing assembly 30, and the housing assembly 30 can slide relative to the compensation assembly 90 such that the fixing plate 31 and the compensation assembly 90 can be slid, and the distance between the fixing plate 31 and the compensation assembly 90 is adjustable. When the rotatory shaft kit 1 is applied to the electronic device 3 and the flexible screen 5 is folded inward, in order to realize the movement of the crank slider, the compensation housing assembly 30 may be controlled to adjust the distance between the fixing plate 31 and the compensation assembly, thereby ensuring the normal bending of the rotatory shaft kit 1 to form a drop-shaped screen. As illustrated FIGS. 16 and 19, FIG. 16 is a schematic cross-sectional view of the rotatory shaft kit 1 in a flattened state, and in this case, the total length of the compensation assembly 90 and the housing assembly 30 is a first length; FIG. 19 is a schematic cross-sectional view of the rotatory shaft kit 1 after a 90° movement, in this case, the housing assembly 30 slides relative to the compensation assembly 90 due to the movement of the crank slider, and the total length of the compensation assembly 90 and the housing assembly 30 is a second length. The second length is greater than the first length. As for how the compensation assembly 90 rotates relative to the first bracket 12, and how the distance between the compensation assembly 90 and the housing assembly 30 can be adjusted, description will be given in detail below.

Figure 20:
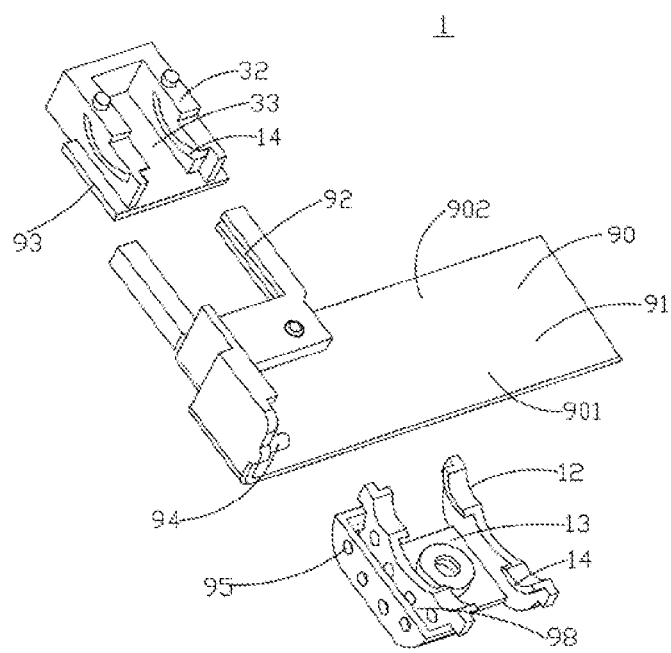
FIG. 20 is a structural schematic view of a compensation assembly, a first bracket, and a second bracket according to an embodiment of the present disclosure.

Referring to FIG. 17 and FIG. 20 together, FIG. 20 is a structural schematic view of a compensation assembly, a first bracket, and a second bracket according to an embodiment of the present disclosure. In the embodiments, the compensation assembly 90 includes a compensation plate 91. The compensation plate 91 includes a first end 901 and a second end 902 that are opposed to each other. The first end 901 is arranged with a third rotating part 94. A fourth rotating part 95 is arranged on the first bracket 12, and the third rotating part 94 is matched with the fourth rotating part 95 to enable the compensation plate 91 to rotate relative to the first bracket 12.

The compensation assembly 90 provided by the present disclosure includes the compensation plate 91. The compensation plate 91 is configured to arrange the third rotating part 94, and the compensation assembly 90 may be matched with the housing 4 of the electronic device 3 to form a shell of the electronic device 3. In addition, since the compensation assembly 90 is not required to carry the flexible screen 5, the compensation plate 91 is not counted as a plate in the four-plate rotatory shaft kit 1. In the present disclosure, the third rotating part 94 may be arranged on the first end 901 of the compensation plate 91, and the fourth rotating part 95 may be arranged on the first bracket 12. The third rotating part 94 can be matched with the fourth rotating part 95 such that the compensation plate 91 can rotate relative to the first bracket 12. In some embodiments, the third rotating part 94 may be a bump or a via hole, and the fourth rotating part 95 may be a via hole or a bump. Further in some embodiments, when the third rotating part 94 is a bump, the fourth rotating part 95 may be a via hole. When the third rotating part 94 is a via hole, the fourth rotating part 95 may be a bump. In the embodiments, the third rotating part 94 as a bump and the fourth rotating part 95 as a via hole are taken as an example for description.

Referring to FIG. 17 and FIG. 20 again, the second end 902 may be arranged with a first sliding part 92, the second bracket 32 may be arranged a second sliding part 93, and the first sliding part 92 and the second sliding part 93 are matched such that the distance between the compensation plate 91 and the fixing plate 31 can be adjusted.

In order to make the distance between the compensation assembly 90 and the fixing plate 31 adjustable, the first sliding part 92 may be arranged on the second end 902 of the compensation plate 91, and the second sliding part 93 may be arranged on the second bracket 32. The first sliding part 92 and the second sliding part 93 are matched with each other to make the distance between the compensation plate 91 and the fixing plate 31 adjustable. In some embodiments, the first sliding part 92 may be a sliding groove or a sliding rail, and the second sliding part 93 may be a sliding rail or a sliding groove. Further in some embodiments, when the first sliding part 92 is a sliding groove, the second sliding part 93 may be a sliding rail. When the first sliding part 92 is a sliding rail, the second sliding part 93 may be a sliding groove. In the embodiments, the first sliding part 92 as a sliding groove and the second sliding part 93 as a sliding rail are taken as an example for description. In the embodiments, a sliding groove is arranged and the sliding groove is fixed on the compensation plate 91, and sliding rails are arranged protruding from the opposite sides of the second bracket 32, such that the second bracket 32 can slide along the sliding groove to change the distance between the compensation plate 91 and the fixing plate 31.

Figure 21:
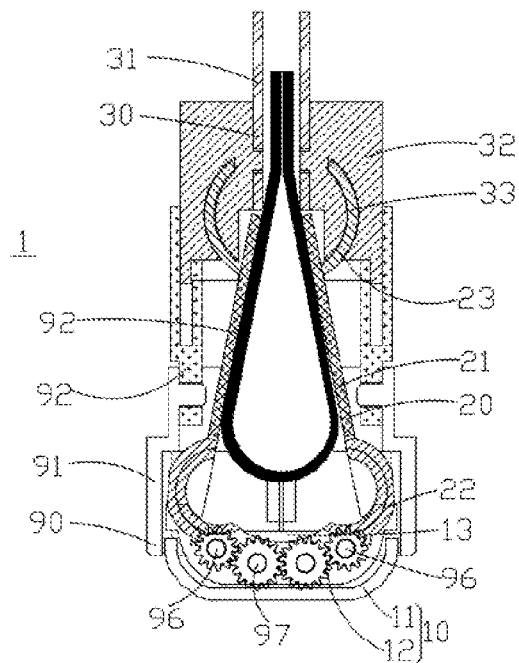
FIG. 21 is a schematic cross-sectional view of a rotatory shaft kit according to further another embodiment of the present disclosure.

Further referring to FIG. 21, FIG. 21 is a schematic cross-sectional view of a rotatory shaft kit according to further another embodiment of the present disclosure. In the embodiments, the rotatory shaft kit 1 further includes a second synchronization mechanism, and the second synchronization mechanism includes first gears 96 arranged on the third rotating part 94 or the fourth rotating part 95, and a gear set 97 arranged on the first bracket 12 and rotatably connected to the first gears 96. When the compensation assembly 90 arranged on a side of the rotatory shaft assembly 10 rotates, a corresponding first gear 96 and the gear set 97 are matched with each other, such that the compensation assemblies 90 on the opposite sides of the rotatory shaft assembly 10 rotate synchronously.

The first synchronization mechanism 2 may be further included in the rotatory shaft kit 1 such that the first rotating members 22 on the opposite sides rotate synchronously, thereby driving the rotating assemblies 20 and the housing assemblies 30 on the opposite sides to rotate synchronously. In the present disclosure, the second synchronization mechanism may enable the compensation assemblies 90 on the opposite sides to rotate synchronously, thereby forming a better drop-shaped screen. Specifically, the first gears 96 may be provided on the third rotating part 94 or the fourth rotating part 95. Since the compensation assemblies 90 are provided on opposite sides, that is, the number of the compensation assemblies 90 is two, the number of the first gear 96 is also two, and the two first gears are arranged opposite to each other. In addition, the gear set 97 is arranged on the first bracket 12, that is, the gear set 97 is arranged between the two first gears 96, such that the gear set 97 rotates and connects the first gears 96 on the opposite sides at the same time. In this way, the compensation assemblies 90 on the opposite sides can rotate synchronously. Specifically, when the compensation assembly 90 on a side starts to rotate, the first gear 96 on the side may be driven to rotate by the third rotating part 94 or the fourth rotating part 95, and the first gear 96 drives the gear set 97 to rotate synchronously. The gear set 97 drives the first gear 96 on the other side to rotate synchronously, and the first gear 96 on the other side drives the compensation assembly 90 on the other side to rotate, and finally causes the compensation assemblies 90 on the opposite sides to rotate synchronously.

In some embodiments, the gear set 97 includes two gears. In some embodiments, the first gear 96 and the gear set 97 may be arranged in a groove 98 defined on the first bracket 12 (as shown in FIG. 17 or FIG. 20).

In addition to the rotatory shaft kit 1 described above, the embodiments of the present disclosure further provides an electronic device 3. Both the electronic device 3 and the rotatory shaft kit 1 provided in the present disclosure can achieve the advantages of the present disclosure. In some embodiments, the rotatory shaft kit 1 provided above may be adopted to form the electronic device 3 below.

Figure 22:
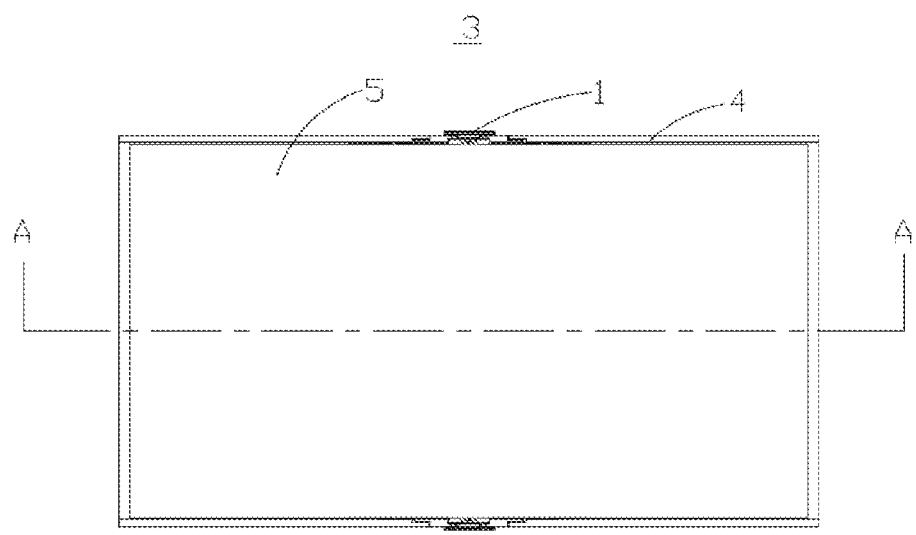
FIG. 22 is a structural schematic view of an electronic device according to an embodiment of the present disclosure.
Figure 23:
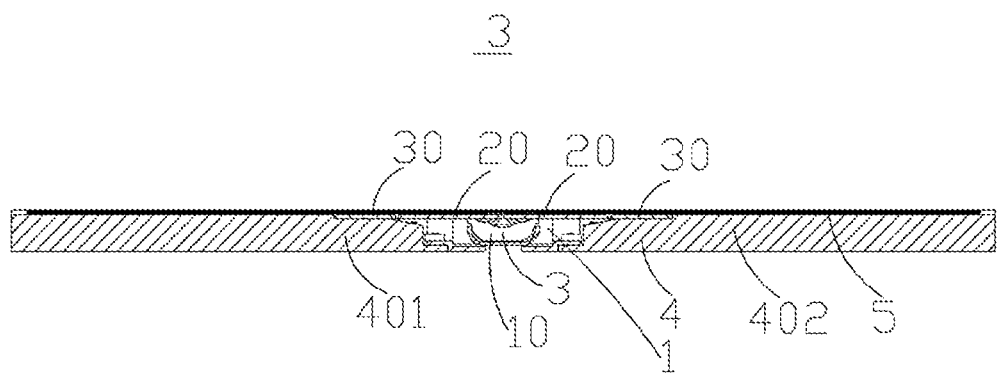
FIG. 23 is a schematic cross-sectional view of FIG. 22 along an A-A direction.
Figure 24:
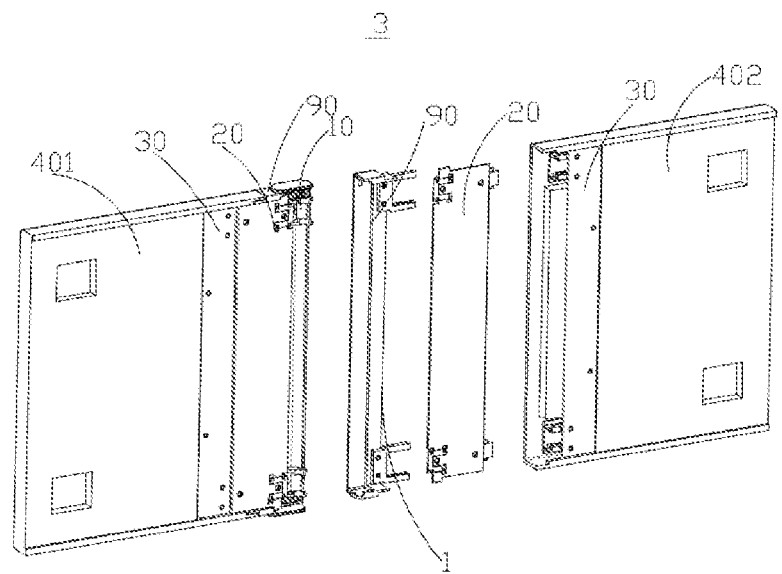
FIG. 24 is an exploded schematic view of a partially structure of the electronic device shown in FIG. 22 after a flexible screen is removed.
Figure 25:
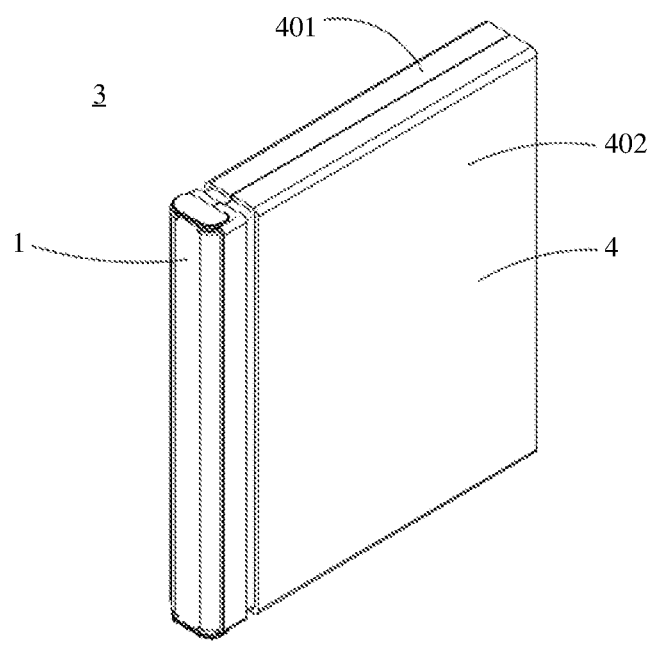
FIG. 25 is a structural schematic view of an electronic device after a movement according to an embodiment of the present disclosure.
Figure 26:
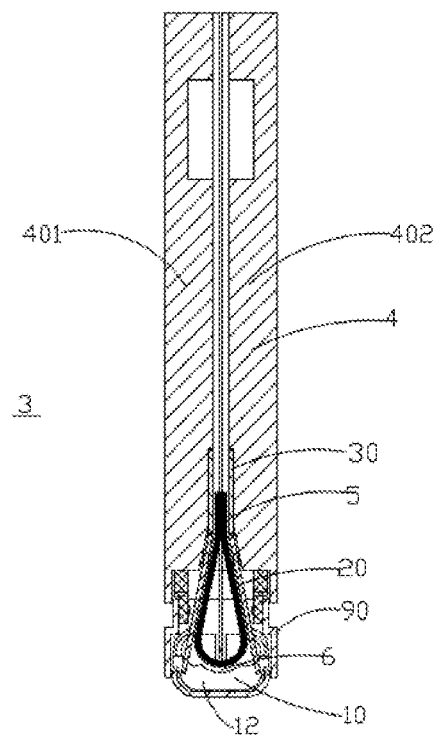
FIG. 26 is a cross-sectional schematic view of an electronic device after a movement according to an embodiment of the present disclosure.

Referring to FIGS. 22-26 together, FIG. 22 is a structural schematic view of an electronic device according to an embodiment of the present disclosure, FIG. 23 is a schematic cross-sectional view of FIG. 22 along an A-A direction, FIG. 24 is an exploded schematic view of a partially structure of the electronic device shown in FIG. 22 after a flexible screen is removed, FIG. 25 is a structural schematic view of an electronic device after a movement according to an embodiment of the present disclosure, and FIG. 26 is a cross-sectional schematic view of an electronic device after a movement according to an embodiment of the present disclosure. The embodiments further provide an electronic device 3. The electronic device 3 includes a housing 4, a flexible screen 5, and the rotatory shaft kit 1 provided in the above embodiments of the present disclosure. The flexible screen 5 is arranged on the housing 4. The housing 4 includes a first sub-housing 401 and a second sub-housing 402 disposed oppositely. The first sub-housing 401 is connected to the housing assembly 30 on a side of the rotatory shaft kit 1, and the second sub-housing 402 is connected to the housing assembly 30 on the other side of the rotatory shaft kit 1.

The electronic device 3 provided by the present disclosure includes, but is not limited to, mobile phones, tablet computers, notebook computers, handheld computers, personal computers (PCs), personal digital assistants (PDAs), portable media players (PMPs), navigation devices, wearable devices, smart bracelets, pedometers and other mobile terminals, and fixed terminals such as digital TVs, desktop computers, etc.

In the electronic device 3 provided in the present disclosure, the flexible screen 5 may be arranged on the housing 4. In some embodiments, the flexible screen 5 is also arranged on the rotatory shaft kit 1 such that the flexible screen 5 can be folded inward, thereby forming a drop-shaped screen. It can be seen from the above that when the rotatory shaft kit 1 includes the rotatory shaft assembly 10, the rotating assembly 20, and the housing assembly 30, the rotatory shaft kit 1 can be bent, thereby driving the housing 4 connected to the housing assembly 30 to bend and further driving the flexible screen 5 to bend to form a U-shaped screen. When the rotatory shaft kit 1 further includes the compensation assembly 90, by virtue of the principle of crank slider movement, when the rotatory shaft kit 1 rotates, the rotating assembly 20 and the housing assembly 30 are kept at an angle tilt, which can also be understood as when the housing 4 rotates by 90°, the rotating assembly 20 and the housing assembly 30 can rotate more than 90°, such that the flexible screen 5 presents the effect of drop-shaped when the flexible screen 5 is bent. Subsequently, the housing assembly 30 is rotated in an opposite direction of the rotation direction relative to the rotating assembly 20, such that the distance between opposite ends of the flexible screen 5 is reduced, and a drop-shaped screen is further formed (as shown in FIG. 26).

The electronic device 3 provided in the present disclosure, by using the rotatory shaft kit 1 provided in the above embodiments of the present disclosure, can reduce the accumulation of gaps between the various components in the rotatory shaft kit 1, thereby reducing the size of the resulting size chain and reducing the amount of falling and scurrying, which improves the quality of the rotatory shaft kit 1 and the electronic device 3.

Referring to FIG. 3, FIG. 4, and FIG. 26 again. In the embodiments, the rotatory shaft kit 1 includes a rotatory shaft assembly 10, the rotatory shaft assembly 10 includes a first bracket 12, and a side of the first bracket 12 close to the flexible screen 5 defines an avoiding groove 6, and the avoiding groove 6 is configured to receive a part of the flexible screen 5 when the electronic device 3 is bent.

During a bending process of the electronic device 3, a bending part of the flexible screen 5 will have a certain displacement toward the first bracket 12. Therefore, in the present disclosure, the escape groove 6 may be defined on the first bracket 12, and it can also be understood that the escape groove 6 is defined on a side surface of the first bracket 12 close to the flexible screen 5. In this way, when the flexible screen 5 is bent, the avoiding groove 6 can accommodate a part of the flexible screen 5 which is displaced toward the first bracket 12, so as to prevent the flexible screen 5 from colliding with the first bracket 12 when the flexible screen 5 is bent.

The above provides a detailed description of the embodiments of the present disclosure. The principles and implementation of the present disclosure are described and illustrated herein, and the above description is only intended to help understand the method of the present disclosure and its core ideas. In addition, for those skilled in the art, there may be changes in the specific implementation and application scope based on the ideas of the present disclosure, and in summary, the contents of this specification should not be understood as a limitation of the present disclosure.

What is claimed is:

1. A rotatory shaft kit, comprising:
    a rotatory shaft assembly, comprising a protective shell and a first bracket arranged on the protective shell; wherein a first accommodating space is defined in the first bracket;
    two rotating assemblies; wherein one of the two rotating assemblies is arranged on a side of the rotatory shaft assembly, and the other of the two rotating assemblies is arranged on another side of the rotatory shaft assembly opposite to the side; each rotating assembly comprises a rotating plate, a first rotating member, and a second rotating member; the first rotating member is connected to the rotating plate at an end of the rotating plate, and the second rotating member is connected to the rotating plate at another end of the rotating plate opposite to the end; the first rotating member is at least partially disposed in the first accommodating space and is rotatable relative to the first bracket;
    two housing assemblies; one of the two housing assemblies is arranged on the side of the rotatory shaft assembly, and the other of the two housing assemblies is arranged on the another side of the rotatory shaft assembly; each housing assembly comprises a second bracket and a fixing plate connected to the second bracket; a second accommodating space is defined in the second bracket; the second rotating member is at least partially disposed in the second accommodating space and is rotatable relative to the second bracket; and
    two compensation assemblies; wherein one of the two compensation assemblies is on the side of the rotatory shaft assembly, and the other of the two compensation assemblies is arranged on the another side of the rotatory shaft assembly; an end of each compensation assembly is rotatably connected to the first bracket, and there is a spacing between a rotation center of each compensation assembly and a rotation center of a corresponding first rotating member; the other end of each compensation assembly is connected to a corresponding housing assembly, and the corresponding housing assembly is slidable relative to the each compensation assembly such that a distance between the fixing plate and the compensation assembly is adjustable; each compensation assembly comprises a compensation plate, and the compensation plate comprises a first end and a second end that are opposed to each other.

2. The rotatory shaft kit according to claim 1, wherein a rotation direction of the second rotating member is consistent with a rotation direction of the first rotating member.

3. The rotatory shaft kit according to claim 1, wherein a first rotating part is arranged on the first bracket, a second rotating part is arranged on the first rotating member, and the first rotating part is matched with the second rotating part, such that the first rotating member is rotatable relative to the first bracket.

4. The rotatory shaft kit according to claim 3, wherein a third rotating part is arranged on the second bracket, a fourth rotating part is arranged on the second rotating member, and the third rotating part is matched with the fourth rotating part such that the second rotating member is rotatable relative to the second bracket.

5. The rotatory shaft kit according to claim 1, further comprising a rotating member disposed in the first accommodating space and connected to the first bracket, and the first rotating member is sleeved with the rotating member such that the first rotating member is rotatable relative to the first bracket.

6. The rotatory shaft kit according to claim 5, further comprising another rotating member disposed in the second accommodating space and connected to the second bracket, and the second rotating member is sleeved with the another rotating member such that the second rotating member is rotatable relative to the second bracket.

7. The rotatory shaft kit according to claim 1, wherein the two first rotating members of the two rotating assemblies, that are arranged on the opposite sides of the rotatory shaft assembly, are denoted as a first rotating member (A) and a first rotating member (B) respectively; the rotatory shaft kit further comprises a first synchronization mechanism connected to the first rotating member (A) and the first rotating member (B), and the first synchronization mechanism is configured to realize a synchronous rotation of the first rotating member (A) with the first rotating member (B).

8. The rotatory shaft kit according to claim 7, wherein the first synchronization mechanism comprises:
the first bracket, comprising a first sub-bracket and a second sub-bracket that are connected; wherein the first sub-bracket defines a first sub-accommodating space, and the second sub-bracket defines a second sub-accommodating space;
a first internal gear and a second internal gear; wherein the first internal gear is arranged in the first rotating member (A), and the first internal gear is disposed in the first sub-accommodating space and is rotatable relative to the first sub-bracket; the second internal gear is arranged in the first rotating member (B), and the second internal gear is disposed in the second sub-accommodating space and is rotatable relative to the second sub-bracket; the first internal gear defines a first receiving space, and the second internal gear defines a second receiving space; and
a first spur gear and a second spur gear; wherein the first spur gear comprises a first sub-spur gear disposed in the first receiving space and a second sub-spur gear disposed outside the first receiving space; the first sub-spur gear is rotatably connected to the first internal gear; the second spur gear comprises a third sub-spur gear disposed in the second receiving space and a fourth sub-spur gear disposed outside the second receiving space; the third sub-spur gear is rotatably connected to the second internal gear, and the fourth sub-spur gear is rotatably connected to the second sub-spur gear; in response to the first rotating member (A) rotating, the first internal gear, the second internal gear, the first spur gear, and the second spur gear are matched with each other to cause the first rotating member (A) and the first rotating member (B) to rotate synchronously.

9. The rotatory shaft kit according to claim 8, wherein a rotation direction of the first internal gear is consistent with an arrangement direction of teeth of the first internal gear; a rotation direction of the second internal gear is consistent with an arrangement direction of teeth of the second internal gear.

10. The rotatory shaft kit according to claim 8, wherein a diameter of the second sub-spur gear is greater than a diameter of the first sub-spur gear; a diameter of the fourth sub-spur gear is greater than a diameter of the third sub-spur gear.

11. The rotatory shaft kit according to claim 8, wherein the first sub-bracket defines a first through hole, and the first spur gear penetrates the first through hole.

12. The rotatory shaft kit according to claim 8, wherein the first sub-bracket is arranged with a first positioning part, the second sub-bracket is arranged with a second positioning part, and the first positioning part and the second positioning part are matched with each other to connect the first sub-bracket to the second sub-bracket.

13. The rotatory shaft kit according to claim 1, wherein the first end is arranged with a third rotating part, and a fourth rotating part is arranged on the first bracket; the third rotating part is matched with the fourth rotating part such that the compensation plate is rotatable relative to the first bracket.

14. The rotatory shaft kit according to claim 1, wherein the second end is arranged with a first sliding part, the second bracket is arranged with a second sliding part, and the first sliding part and the second sliding part are matched such that a distance between the compensation plate and the fixing plate is adjustable.

15. The rotatory shaft kit according to claim 13, further comprising a second synchronization mechanism; wherein the second synchronization mechanism comprises two first gears each arranged on the third rotating part or the fourth rotating part, and a gear set arranged on the first bracket and rotatably connected to the two first gears; in response to each compensation assembly rotating, a corresponding first gear and the gear set are matched with each other, such that the two compensation assemblies rotate synchronously.

16. The rotatory shaft kit according to claim 15, wherein the two first gears and the gear set are arranged in a groove defined on the first bracket.

17. An electronic device, comprising a housing, a flexible screen, and a rotatory shaft kit;
wherein the rotatory shaft kit comprises:
a protective shell and a first bracket arranged on the protective shell; wherein a first accommodating space is defined in the first bracket;
two rotating assemblies; wherein one of the two rotating assemblies is arranged on a side of a rotatory shaft assembly, and the other of the two rotating assemblies is arranged on another side of the rotatory shaft assembly opposite to the side; each rotating assembly comprises a rotating plate, a first rotating member, and a second rotating member; the first rotating member is connected to the rotating plate at an end of the rotating plate, and the second rotating member is connected to the rotating plate at another end of the rotating plate opposite to the end; the first rotating member is at least partially disposed in the first accommodating space and is rotatable relative to the first bracket;
two housing assemblies; one of the two housing assemblies is arranged on the side of the rotatory shaft assembly, and the other of the two housing assemblies is arranged on the another side of the rotatory shaft assembly; each housing assembly comprises a second bracket and a fixing plate connected to the second bracket; a second accommodating space is defined in the second bracket; the second rotating member is at least partially disposed in the second accommodating space and is rotatable relative to the second bracket; and
two compensation assemblies; wherein one of the two compensation assemblies is on the side of the rotatory shaft assembly, and the other of the two compensation assemblies is arranged on the another side of the rotatory shaft assembly; an end of each compensation assembly is rotatably connected to the first bracket, and there is a spacing between a rotation center of each compensation assembly and a rotation center of a corresponding first rotating member; the other end of each compensation assembly is connected to a corresponding housing assembly, and the corresponding housing assembly is slidable relative to the each compensation assembly such that a distance between the fixing plate and the compensation assembly is adjustable; each compensation assembly comprises a compensation plate, and the compensation plate comprises a first end and a second end that are opposed to each other;

wherein the flexible screen is arranged on the housing; the housing comprises a first sub-housing and a second sub-housing disposed oppositely; the first sub-housing is connected to one of the housing assemblies arranged on the side of the rotatory shaft kit, and the second sub-housing is connected to the other of the two housing assemblies arranged on the another side of the rotatory shaft kit.

18. The electronic device according to claim 17, wherein the flexible screen is arranged on the rotatory shaft kit such that the flexible screen is inwardly foldable.

19. The electronic device according to claim 18, wherein a side of the first bracket close to the flexible screen defines an avoiding groove, and the avoiding groove is configured to receive a part of the flexible screen in response to the electronic device being bent.

\* \* \* \* \*